(12) United States Patent
Moon et al.

(10) Patent No.: US 10,933,354 B2
(45) Date of Patent: Mar. 2, 2021

(54) ROTATING TYPE FOREIGN SUBSTANCE COLLECTION EQUIPMENT

(71) Applicant: KOREA INSTITUTE OF SCIENCE AND TECHNOLOGY, Seoul (KR)

(72) Inventors: Myoung-Woon Moon, Seoul (KR); Kwang Ryeol Lee, Seoul (KR); Seohyun Cho, Seoul (KR); Young A Lee, Seoul (KR); O Chang Kwon, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/127,162

(22) Filed: Sep. 10, 2018

(65) Prior Publication Data

US 2019/0255467 A1 Aug. 22, 2019

(30) Foreign Application Priority Data

Feb. 19, 2018 (KR) .......................... 10-2018-0019564

(51) Int. Cl.
*B01D 29/25* (2006.01)
*B01D 43/00* (2006.01)
*B01D 17/04* (2006.01)
*E02B 15/10* (2006.01)
*B01D 36/00* (2006.01)

(52) U.S. Cl.
CPC ............. *B01D 29/25* (2013.01); *B01D 17/04* (2013.01); *B01D 17/041* (2013.01); *B01D 17/045* (2013.01); *B01D 36/003* (2013.01); *B01D 43/00* (2013.01)

(58) Field of Classification Search
CPC .... B01D 29/25; B01D 17/041; B01D 17/045; B01D 17/04; B01D 36/003; B01D 43/00
See application file for complete search history.

(56) References Cited

FOREIGN PATENT DOCUMENTS

| CN | 102380230 B | * | 7/2013 |
| CN | 104162304 A | * | 11/2014 |
| JP | 2006272058 A | * | 10/2006 |
| JP | 2008279339 A | * | 11/2008 |
| KR | 200251579 Y1 | | 11/2001 |
| KR | 100995875 B1 | | 11/2010 |
| KR | 101133112 B1 | * | 4/2012 |
| KR | 101403751 B1 | | 6/2014 |
| KR | 1020150108287 A | | 9/2015 |
| KR | 101594532 B1 | | 2/2016 |

OTHER PUBLICATIONS

Korean Office Action for KR Application No. 10-2018-0019564 dated Jul. 30, 2019.

* cited by examiner

*Primary Examiner* — Waqaas Ali
(74) *Attorney, Agent, or Firm* — Cantor Colburn LLP

(57) ABSTRACT

The present disclosure relates to a rotating type foreign substance collection equipment, and according to an embodiment of the present disclosure, there is an effect in separating and collecting foreign substances such as oil from foreign substance-fluid mixtures at high speeds by the separation membrane that traps foreign substances such as oil that float in water while allowing sea water or river water to pass through and be discharged.

5 Claims, 10 Drawing Sheets

ROTATING TYPE FOREIGN SUBSTANCE COLLECTION EQUIPMENT

CROSS-REFERENCE TO RELATED APPLICATIONS

This application claims priority under 35 U.S.C. § 119 to Korean Patent Application No. 10-2018-0019564 filed on 2018 Feb. 19 in the Korean Intellectual Property Office, the disclosure of which is incorporated herein by reference in its entirety.

TECHNICAL FIELD

The present disclosure relates to a rotating type foreign substance collection equipment, and more particularly, a rotating type foreign substance collection equipment having a screw type oil collection component and a separation membrane that allows water to penetrate while disallowing oil to penetrate so as to quickly remove spilled oil in the event of oil spills at seas, in which as the oil collection component rotates, oil rises along the screw and water flow out to the seas or rivers through the separation membrane.

BACKGROUND

When oil spill accidents occur in seas and rivers, oil or hazardous & noxious substance (HNS) spreads out rapidly on the surface of the seas and rivers, causing serious environmental pollution.

Accordingly, when oil or HNS spill accidents occur, it is important to quickly remove the spilled oil or HNS.

When oil is spilled, in general, there is a method that sprays an emulsifying agent to the water surface on which oil floats to cause oil to sink to the bottom of the seas or rivers, or a method that removes oil in coastal areas using oil absorbent fabrics after pollutants spread to the coastal areas.

However, the emulsifying agent causes oil to sink, causing a problem with secondary pollution, and oil removal by oil absorbent is a method that can be only used after the spread of pollutants becomes serious, and accordingly, there is a demand for development of technology for effective oil containment and collection immediately after oil spills occur.

According to reports, an oil skimmer is used to collect oil, and during collection, a larger amount of water is collected and a situation occurs in which a larger amount of water than oil is stored in an oil storage, resulting in low oil collection efficiency.

Meanwhile, Korean Patent No. 10-0995875 discloses palm oil mill effluent treatment equipment that dries wastewater generated in the process of collecting palm oil from palm fruits to improve ammonia gas generating from conventional anaerobic treatment and effluent water quality and use sludge as compost.

In the case of treatment equipment disclosed by the above-described Korean Patent Literature, an abrasion resistant packing member 21 such as synthetic rubber is fitted to the outer peripheral surface edge of a screw 13 to prevent a direct contact of the screw 13 with a water filter 12, thereby preventing the abrasion or damage of the water filter 12.

However, in the case of such a structure, as the treatment operation progresses, sludge is accumulated between the packing member 21 and the water filter 12, causing problems with an increase in maintenance/repair costs for sludge removal and a reduction in treatment operation efficiency.

RELATED LITERATURES

Patent Literatures

Korean Patent No. 10-1594532 titled 'Absorbent fabric feeding device built in the unmanned catamaran and management method of the same'

Korean Utility Model No. 20-0251579 titled 'Outflow oil absorber'

Korean Patent No. 10-0995875 titled 'Palm oil mill effluent treatment equipment'

SUMMARY

The present disclosure is designed under the above-described background, and therefore the present disclosure is directed to providing a rotating type foreign substance collection equipment including a separation membrane that allows water (one of fluids other than foreign substances to be collected in a foreign substance-fluid mixture) to penetrate while disallowing oil (one of foreign substances to be collected in a foreign substance-fluid mixture) to penetrate, so as to quickly discharge water in the process of collecting oil, thereby quickly collecting oil or hazardous & noxious substance (HNS).

The present disclosure is further directed to providing a rotating type foreign substance collection equipment in which oil is continuously collected by rotation of a screw body having a spiral wing part, thereby improving the efficiency of oil collecting operation.

The present disclosure is further directed to providing a rotating type foreign substance collection equipment which achieves simultaneous oil collection and storage.

The present disclosure is further directed to providing a rotating type foreign substance collection equipment in which a separation process of water and oil is performed by rotation of a screw body and a separation membrane together, thereby eradicating the conventional problem with sludge accumulation on the packing member.

The objects of the present disclosure are not limited thereto, and another object not mentioned herein will be clearly understood by those skilled in the art from the following description.

To achieve these objects, an embodiment of the present disclosure provides a rotating type foreign substance collection equipment including a screw body including a spiral wing part continuously formed along a central shaft, and a separation membrane coupled around an exterior of the spiral wing part to allow for selective outward penetration of a fluid other than a foreign substance to be collected in a foreign substance-fluid mixture that rises along the spiral wing part as the screw body rotates.

Additionally, there is provided the rotating type foreign substance collection equipment including a storage part connected to the screw body to store the foreign substance included in the foreign substance-fluid mixture rising along the spiral wing part.

Additionally, there is provided the rotating type foreign substance collection equipment wherein the spiral wing part includes a section with a smaller pitch interval.

Additionally, there is provided the rotating type foreign substance collection equipment wherein the spiral wing part includes a plurality of protrusions on a surface to which the foreign substance-fluid mixture is attached, to improve a contact area with the foreign substance-fluid mixture.

Additionally, there is provided the rotating type foreign substance collection equipment wherein the separation membrane includes a porous material surface-treated to have hydrophilicity.

Additionally, there is provided the rotating type foreign substance collection equipment wherein the separation membrane is in a shape of a net-type mesh which is a porous structure including mesh pores.

Additionally, there is provided the rotating type foreign substance collection equipment wherein the separation membrane includes a nano protrusion structure formed on a surface.

Additionally, there is provided the rotating type foreign substance collection equipment including a driving part to supply a rotational driving force to the central shaft of the screw body.

Another embodiment of the present disclosure provides a foreign substance collection method using a rotating type foreign substance collection equipment, including coupling a separation membrane having porosity and hydrophilicity to a screw body including a spiral wing part continuously formed along a central shaft, rotating the screw body to discharge a fluid other than a foreign substance to be collected in a foreign substance-fluid mixture out of the separation membrane, and storing the foreign substance to be collected in a storage part.

According to an embodiment of the present disclosure, there is an effect in separating and collecting foreign substances such as oil from the foreign substance-fluid mixture at high speeds by the separation membrane that traps foreign substances such as oil that float in water while allowing sea water or river water to pass through and be discharged.

Additionally, there is an effect in eradicating the conventional problem with sludge accumulation on the packing member as the separation process of water and oil is performed by rotation of the screw body and the separation membrane together.

DETAILED DESCRIPTION OF EMBODIMENTS

Hereinafter, certain embodiments of the present disclosure will be described in detail through exemplary drawings. It should be noted that in adding reference symbols to elements of each drawing, like elements have like reference symbols if possible even though they are indicated on different drawings. Additionally, in describing the present disclosure, when certain details of relevant well-known configuration or function are determined to render the subject matter of the present disclosure vague, its detailed description is omitted herein.

Furthermore, in describing the elements of the present disclosure, the terms 'first', 'second', A, B, (a), (b), and the like may be used. These terms are only used to distinguish one element from another, and the nature of the corresponding element or its turn or order is not limited by the term. It should be understood that when an element is referred to as being "connected", "coupled" or "linked" to another element, it may be directly connected or linked to other element, but intervening elements may be "connected", "coupled" or "linked" between each element.

Figure 1:
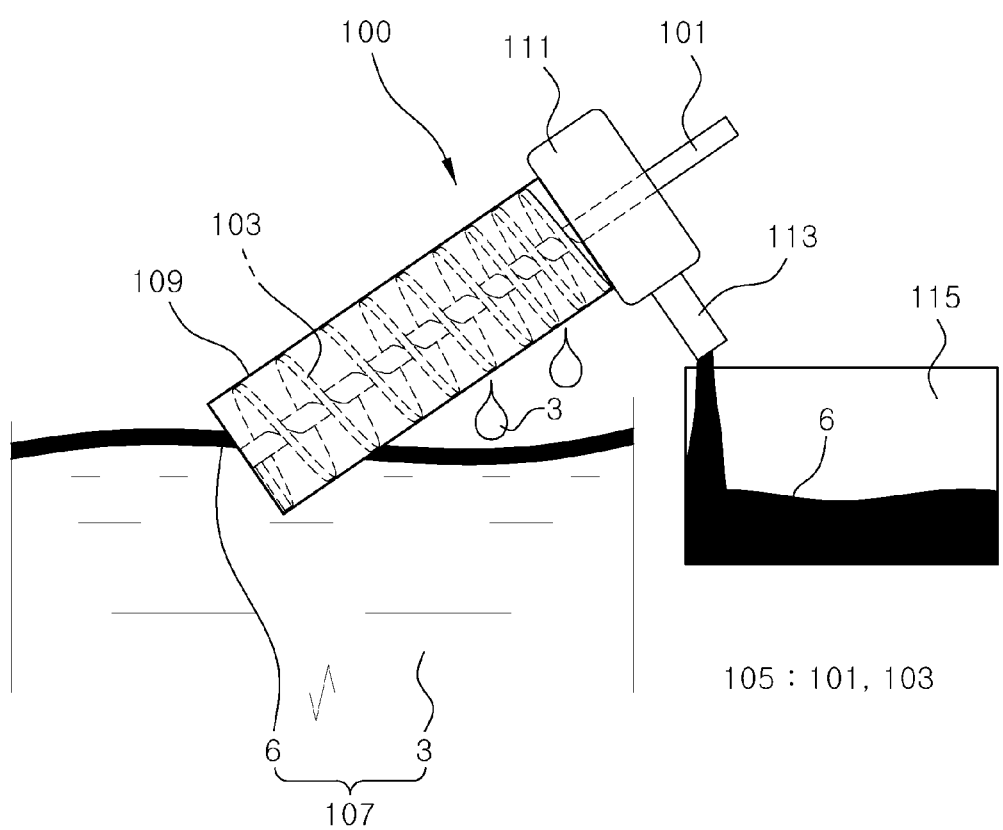
FIG. 1 is a diagram showing a rotating type foreign substance collection equipment according to an embodiment of the present disclosure.
Figure 2:
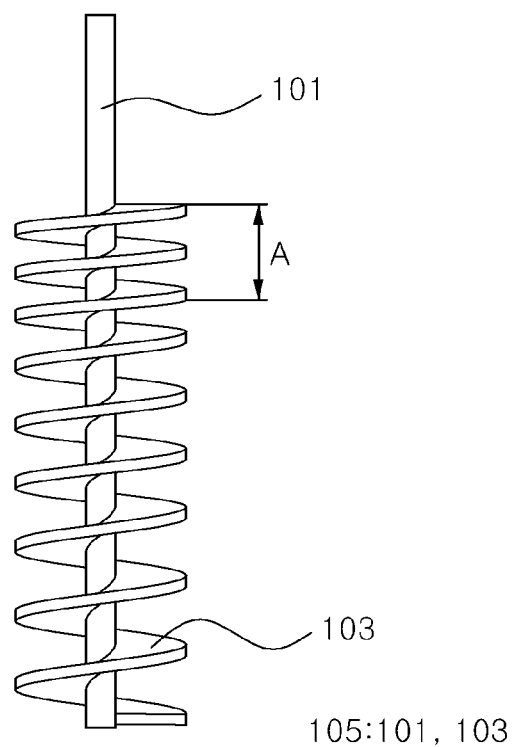
FIG. 2 is a diagram showing a screw body of the rotating type foreign substance collection equipment of FIG. 1.
Figure 3:
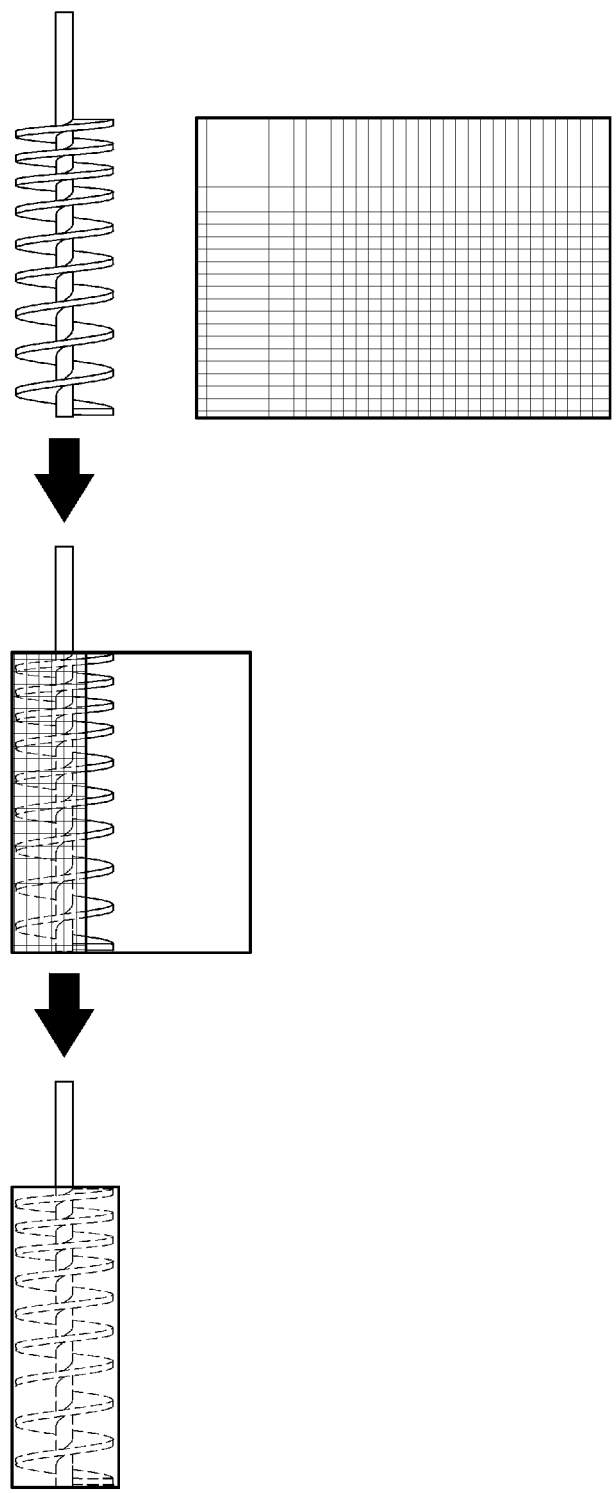
FIG. 3 is a diagram showing an example of a process of manufacturing the rotating type foreign substance collection equipment of FIG. 1.
Figure 4:
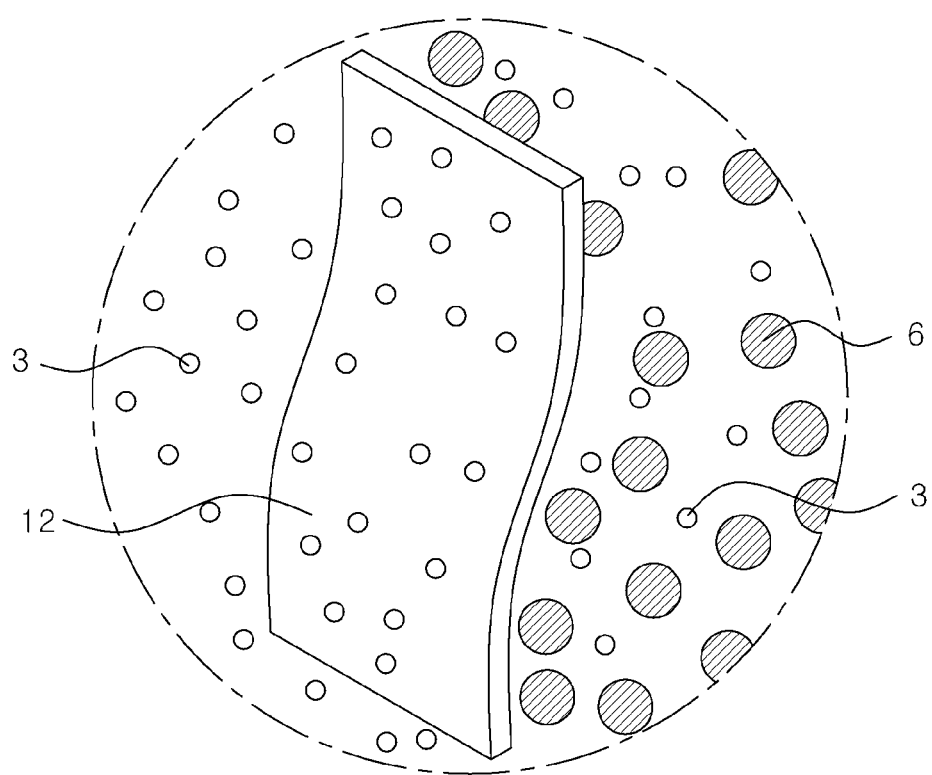
FIG. 4 is a diagram showing an example of selective penetration of a separation membrane of the rotating type foreign substance collection equipment of FIG. 1.
Figure 5:
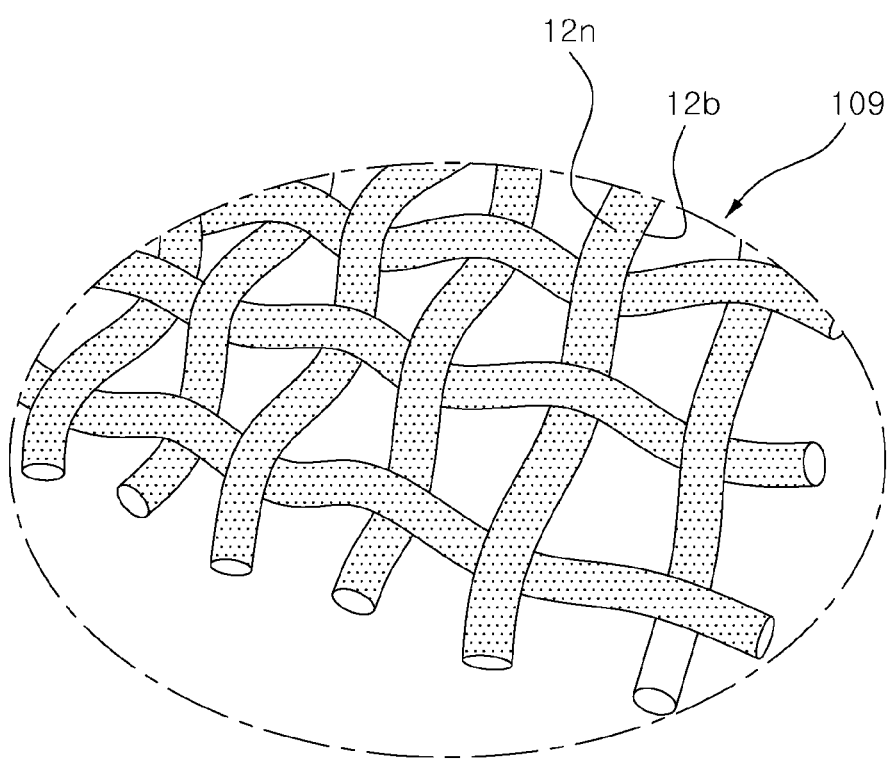
FIG. 5 is a diagram showing an example of nano protrusion structure formed on the separation membrane surface of the rotating type foreign substance collection equipment of FIG. 1.
Figure 6:
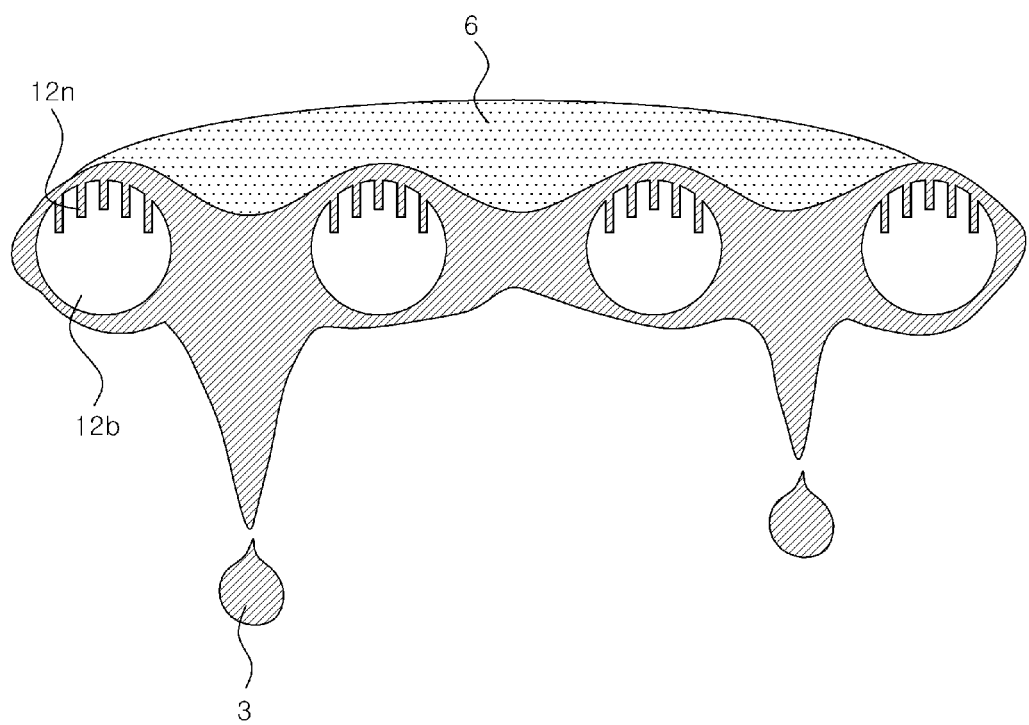
FIG. 6 is a diagram showing another example of the nano protrusion structure of FIG. 5.
Figure 7:
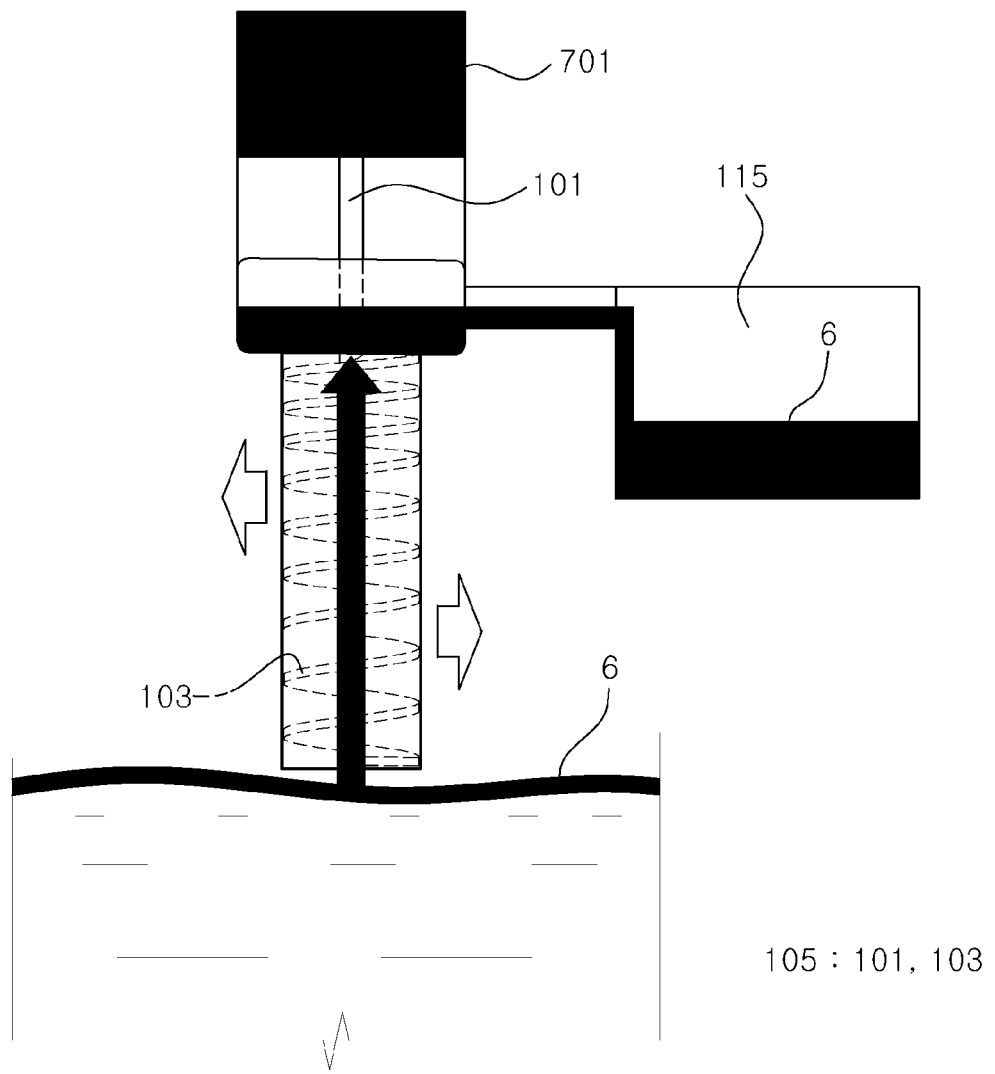
FIG. 7 is a diagram showing an example in which a driving part is included in the rotating type foreign substance collection equipment of FIG. 1.
Figure 8:
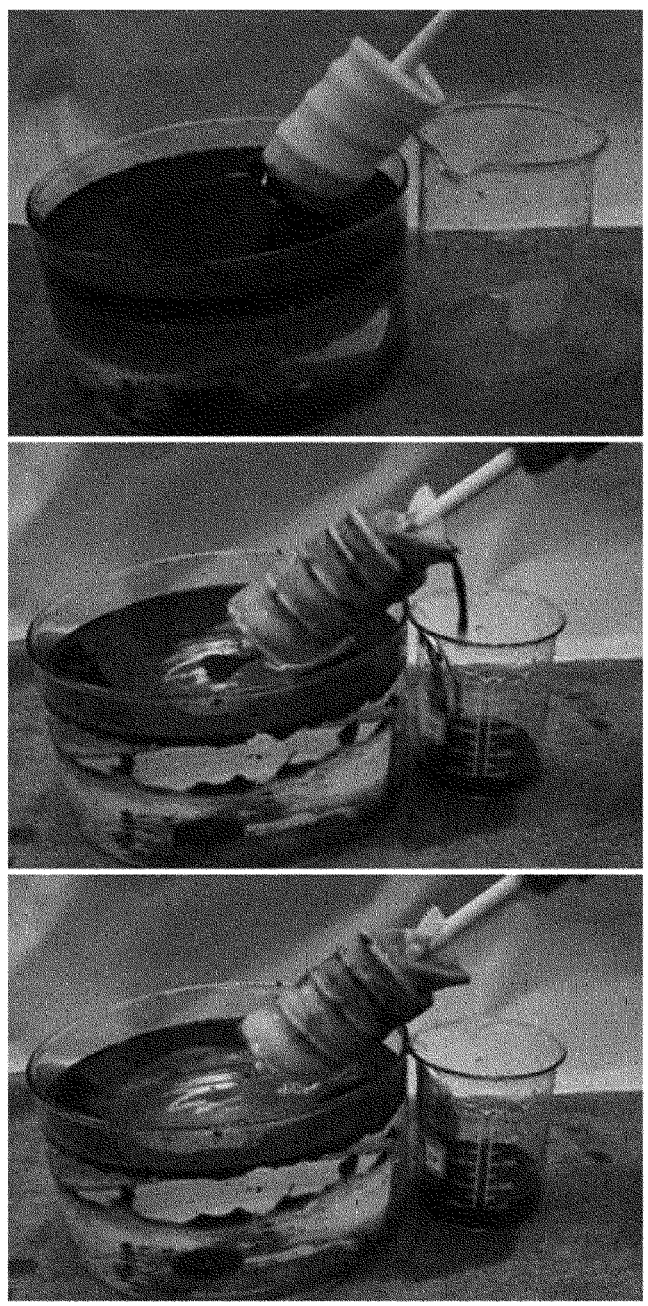
FIG. 8 is a diagram showing an oil collection process using the rotating type foreign substance collection equipment of FIG. 1.
Figure 9:
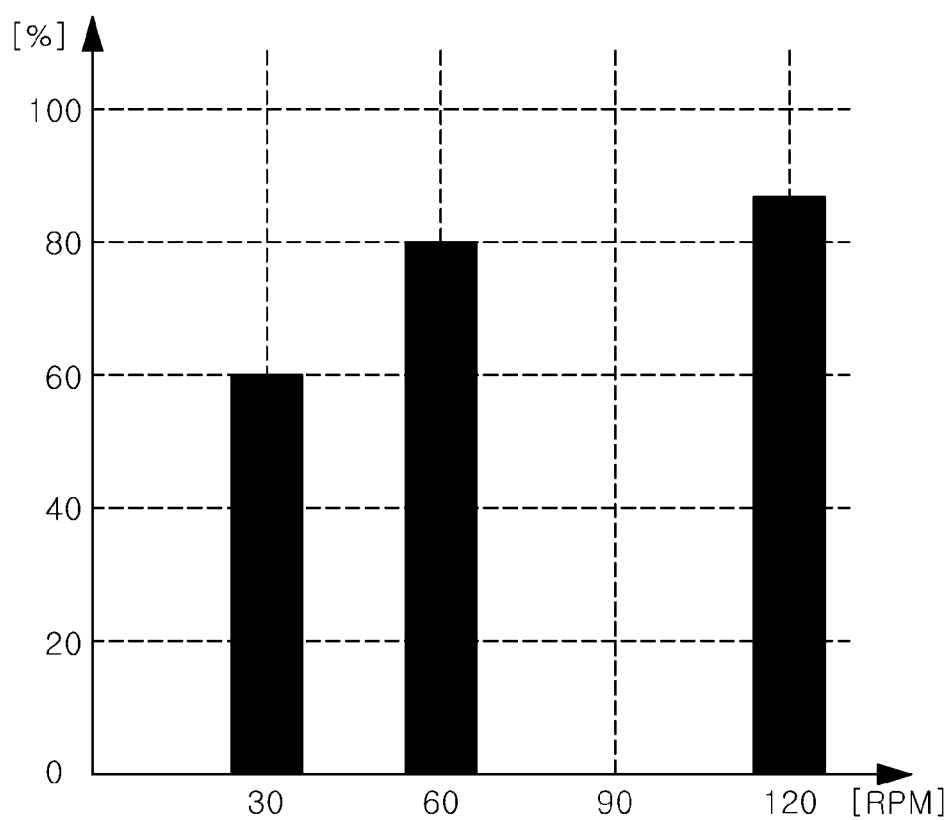
FIG. 9 is a diagram showing foreign substance collection percentage as a function of screw body rotation rate in the rotating type foreign substance collection equipment of FIG. 1.
Figure 10:
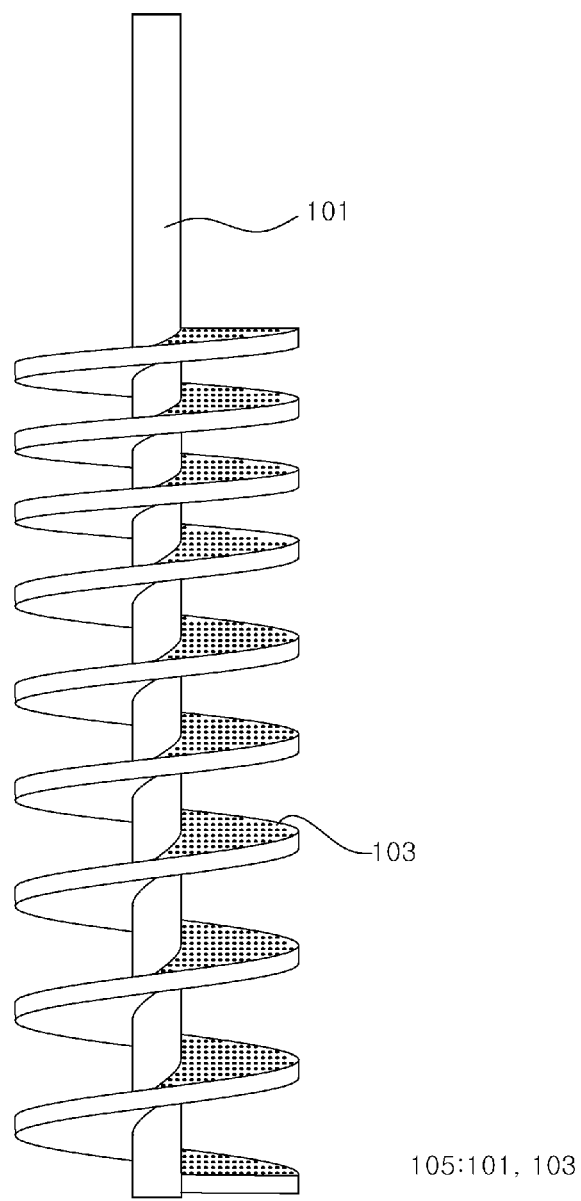
FIG. 10 is a diagram showing an example of a plurality of protrusions formed on the surface of a spiral wing part of the rotating type foreign substance collection equipment of FIG. 1.

FIG. 1 is a diagram showing a rotating type foreign substance collection equipment according to an embodiment of the present disclosure. FIG. 2 is a diagram showing a screw body of the rotating type foreign substance collection equipment of FIG. 1. FIG. 3 is a diagram showing an example of a process of manufacturing the rotating type foreign substance collection equipment of FIG. 1. FIG. 4 is a diagram showing an example of selective penetration of a separation membrane of the rotating type foreign substance collection equipment of FIG. 1. FIG. 5 is a diagram showing an example of nano protrusion structure formed on the separation membrane surface of the rotating type foreign substance collection equipment of FIG. 1. FIG. 6 is a diagram showing another example of the nano protrusion structure of FIG. 5. FIG. 7 is a diagram showing an example in which a driving part is included in the rotating type foreign substance collection equipment of FIG. 1. FIG. 8 is a diagram showing an oil collection process using the rotating type foreign substance collection equipment of FIG. 1. FIG. 9 is a diagram showing foreign substance collection percentage as a function of screw body rotation rate in the rotating type foreign substance collection equipment of FIG. 1. FIG. 10 is a diagram showing an example of a plurality of protrusions formed on the surface of a spiral wing part of the rotating type foreign substance collection equipment of FIG. 1.

As shown in these drawings, the rotating type foreign substance collection equipment 100 according to an embodiment of the present disclosure includes a screw body 105 including a spiral wing 103 continuously formed along a central shaft 101, and a separation membrane 109 coupled around the exterior of the spiral wing part 103 to allow for selective outward penetration of a fluid 3 other than foreign substance to be collected in a foreign substance-fluid mixture 107 rising along the spiral wing part 103 with the rotation of the screw body 105.

The screw body 105 includes the spiral wing part 103 continuously formed along the central shaft 101.

The central shaft 101 is provided, for example, in the shape of a long circular bar.

The spiral wing part 103 is continuously formed along the outer peripheral surface of the central shaft 101.

The outer diameter of the spiral wing part 103 may range from 10 mm to 1 m.

The spiral wing part 103 may have a pitch interval of 10 mm or more in size.

Additionally, the spiral wing part 103 may include a section A with smaller pitch interval.

The inclusion of the section A with smaller pitch interval in the spiral wing part 103 may increase the movement path distance of the foreign substance-fluid mixture rising along the spiral wing part 103, and as a consequence, increase the number of filtering of the foreign substance-fluid mixture, during the use of the rotating type foreign substance collection equipment 100.

Of course, a plurality of sections A with smaller pitch interval may be formed at an equal distance, and a plurality of sections A with smaller pitch interval may be formed at a non-equal distance.

Meanwhile, as shown in FIG. 10, to improve the contact area with the foreign substance-fluid mixture 107, the spiral wing part 103 may include a plurality of protrusions formed on the surface to which the foreign substance-fluid mixture 107 is attached.

As the plurality of protrusions is formed on the spiral wing part 103 as described above, the foreign substance-fluid mixture 107 rises along the spiral wing part 103 of the screw body 105 more efficiently during the operation of the rotating type foreign substance collection equipment 100.

Subsequently, the separation membrane 109 is coupled around the exterior of the spiral wing part 103.

The separation membrane 109 may have a contact angle with water in air of 20° or less, and a contact angle with oil in water of 140° or more.

The separation membrane 109 allows for selective outward penetration of the fluid 3 other than foreign substance to be collected in the foreign substance-fluid mixture 107 rising along the spiral wing part 103 with the rotation of the screw body 105.

That is, the separation membrane 109 performs a function to trap the foreign substance 6 while allowing for penetration of only the fluid 3 other than foreign substance to be collected in the foreign substance-fluid mixture 107.

Here, the foreign substance 6 may be oil, hazardous & noxious substance, etc.

The following description is made on the basis that water is exemplified as the fluid 3 other than foreign substance to be collected in the foreign substance-fluid mixture 107.

Meanwhile, the separation membrane 109 may include a porous material surface-treated to have hydrophilicity.

The separation membrane 109 is manufactured with hydrophilicity by including micrometer level pores.

Additionally, the separation membrane 109 may be in the shape of a net-type mesh 12b which is a porous structure including mesh pores.

Meanwhile, the size (diameter) of the mesh pores may be 1 to 500 micrometers.

Here, the shape of the net-type mesh 12b may be constructed by arranging fiber strands at such a distance between the fiber strands to form macro-pores of 1 to 500 micrometers.

Additionally, the separation membrane 109 may include a nano protrusion structure 12n formed on the surface.

Meanwhile, the nano protrusion structure 12n may be formed with the diameter of 1 to 100 nanometers.

Here, the nano protrusion structure 12n may be made of a polymer material.

Additionally, the nano protrusion structure 12n may be a nano-hair, a nano-fiber, a nano-pillar, a nano-rod and a nano-wire.

The formation of the nano protrusion structure 12n in the separation membrane 109 improves hydrophilicity on the surface of the separation membrane 109.

Because the separation membrane 109 has wettability for the water 3 and a property to absorb the water 3, the separation membrane 109 allows the water 3 to easily pass through.

Accordingly, when a mixed liquid of the foreign substance 6 such as oil and the water 3 (the foreign substance-fluid mixture 107) is allowed to pass through the separation membrane 109, the water 3 easily passes through the separation membrane 109, whereas the foreign substance 6 does not pass through the separation membrane 109 due to the repulsive force against the water 3 and is filtered and trapped by the separation membrane 109.

Meanwhile, the nano protrusion structure 12n may be made, as shown in FIG. 6, by forming a plurality of grooves in the net-type mesh 12b.

As the net-type mesh 12b has a superhydrophilic property by the nano protrusion structure 12n, when the water 3 and the foreign substance 6 come into contact with the net-type mesh 12b, the water 3 comes into contact with the surface of the hydrophilic porous substrate, forming a water film on the surface of the net-type mesh 12b due to strong bonding between the water 3 and the net-type mesh 12b.

According, the foreign substance 6 does not pass through the pores of the net-type mesh 12b due to repulsion of the water film on the surface of the net-type mesh 12b, and eventually the foreign substance 6 may be trapped by the separation membrane 109.

Meanwhile, the rotating type foreign substance collection equipment 100 according to an embodiment of the present disclosure includes a storage part 111 connected to the screw body 105 to store the foreign substance 6 included in the foreign substance-fluid mixture 107 rising along the spiral wing part 103.

The storage part 111 is provided, for example, in the shape of a barrel (box) having an inner space, and a discharge guide part 113 is formed on the side surface of the storage part 111 to guide the discharge of the foreign substance 6.

As the rotating type foreign substance collection equipment 100 is provided with the storage part 111, the foreign substance 6 rising along the spiral wing part 103 does not flow out and gathers in the storage part 111, and the foreign substance 6 collected in the storage part 111 may be transferred to a separate collection tank 115 again.

Additionally, the rotating type foreign substance collection equipment 100 according to an embodiment of the present disclosure includes a driving part 701 to supply a rotational driving force to the central shaft 101 of the screw body 105.

Here, the driving part 701 may be provided as, for example, an electric motor.

As the rotating type foreign substance collection equipment 100 is provided with the driving part 701, the oil collection operation may be automatically performed, and the speed of the oil collection operation may be actively adjusted.

Describing the operation process of the rotating type foreign substance collection equipment 100 according to an embodiment of the present disclosure with reference to the drawings, the rotating type foreign substance collection equipment 100 is put in the foreign substance-fluid mixture 107 to collect the foreign substance 6, such as oil, floating on the water 3.

Subsequently, when the screw body 105 rotates, the foreign substance-fluid mixture 107 rises along the spiral wing part 103 from the lower part of the spiral wing part 103.

In this instance, the foreign substance-fluid mixture 107 rising along the spiral wing part 103 is subjected to a centrifugal force, and is pushed to the outer periphery of the spiral wing part 103 and comes into contact with the separation membrane 109.

Subsequently, water 3 in the foreign substance-fluid mixture 107 is discharged outward through the separation membrane 109, and the foreign substance 6 such as oil continues to rise along the spiral wing part 103 and moves to the topmost of the spiral wing part 103.

The foreign substance 6 having moved to the topmost of the spiral wing part 103 is collected in the storage part 111 and then discharged, and thereby the foreign substance separation/collection process is completed.

Meanwhile, the rotating type foreign substance collection equipment 100 according to an embodiment of the present disclosure has varying foreign substance (oil) collection percentages per minute depending on the rotation speed of the screw body 105, and a relationship between the rotation speed (RPM) of the screw body 105 and the foreign substance collection percentage is as shown in FIG. 9.

That is, when the rotation speed of the screw body 105 is 30, the collection percentage is 60%, when the rotation speed is 60, the collection percentage is 80%, and when the rotation speed is 120, the collection percentage exceeds 80%.

As described above, according to an embodiment of the present disclosure, there is an effect in separating and collecting foreign substances such as oil from the foreign substance-fluid mixture at high speeds by the separation membrane that traps foreign substances such as oil that float in water while allowing sea water or river water to pass through and be discharged.

Although the foregoing statements describe that all the elements constituting the embodiment of the present disclosure are combined into one or work in combination, the present disclosure is not necessarily limited to the disclosed embodiment. That is, the elements may be selectively combined into at least one within the intended scope of the present disclosure.

It should be understood, unless otherwise stated to the contrary, the terms "including", "comprising" or "having" as used herein specify the presence of mentioned element, but do not exclude the presence or addition of one or more other elements. Unless otherwise defined herein, all terms used herein including technical or scientific terms have the same meaning as commonly understood by those having ordinary skill in the technical field pertaining to the present disclosure. The commonly used terms such as those defined in dictionaries should be interpreted as being consistent with the meaning in the context of the relevant art, and unless explicitly defined herein, they are not interpreted in ideal or excessively formal sense.

The foregoing description is provided to describe the technical spirit of the present disclosure by way of example only, and it is obvious to those having ordinary skill in the technical field pertaining to the present disclosure that various changes and modifications may be made thereto without departing from the essential features of the present disclosure. Therefore, the embodiments disclosed herein serve to describe the technical spirit of the present disclosure, but not intended to limit the technical spirit of the present disclosure, and the scope of technical spirit of the present disclosure is not limited by these embodiments. The scope of protection of the present disclosure should be interpreted by the appended claims, and the full technical spirit within its equivalent scope should be construed as falling in the scope of protection of the present disclosure.

DETAILED DESCRIPTION OF MAIN ELEMENTS

3: Water
6: Foreign substance
12b: Net-type mesh
12n: Nano protrusion structure
100: Rotating type foreign substance collection equipment
101: Central shaft
103: Spiral wing part
105: Screw body
107: Foreign substance-fluid mixture
109: Separation membrane
111: Storage part
113: Discharge guide part
115: Collection tank
701: Driving part

What is claimed is:

1. A rotating type foreign substance collection equipment, comprising:
    a screw body including a spiral wing part continuously formed along a central shaft; and
    a separation membrane coupled around an exterior of the spiral wing part to allow for selective outward penetration of a fluid other than a foreign substance to be collected in a foreign substance-fluid mixture that rises along the spiral wing part as the screw body rotates,
    wherein a pitch interval is a distance between two adjacent crests of the spiral wing part that continuously formed along the central shaft,
    wherein the spiral wing part includes a section with a smaller pitch interval,
    wherein the separation membrane is a porous material having a nano protrusion structure formed on a surface to have hydrophilicity,
    wherein the separation membrane has a contact angle with water in air of 20° or less, and a contact angle with oil in water of 140° or more,
    wherein the nano protrusion structure is made of a polymer material and the nano protrusion structure is formed with a diameter of 1 to 100 nanometers.

2. The rotating type foreign substance collection equipment according to claim 1, comprising:
    a storage part connected to the screw body to store the foreign substance included in the foreign substance-fluid mixture rising along the spiral wing part.

3. The rotating type foreign substance collection equipment according to claim 1, wherein the spiral wing part includes a plurality of protrusions on a surface to which the foreign substance-fluid mixture is attached, to improve a contact area with the foreign substance-fluid mixture.

4. The rotating type foreign substance collection equipment according to claim 1, wherein the separation membrane is in a shape of a net-type mesh which is a porous structure including mesh pores.

5. The rotating type foreign substance collection equipment according to claim 1, comprising:

a driving part to supply a rotational driving force to the central shaft of the screw body.

\* \* \* \* \*